United States Patent Office.

RICHARD B. STEVENSON, OF YORK TOWNSHIP, OHIO.

Letters Patent No. 60,957, dated January 1, 1867.

IMPROVED COMPOSITION PASTE OR CEMENT FOR ROOFING.

The Schedule referred to in these Letters Patent and making part of the same.

TO ALL WHOM IT MAY CONCERN:

Be it known that I, RICHARD B. STEVENSON, of York Township, in the county of Sandusky, and State of Ohio, have invented a new and improved "Composition Paste or Cement Roofing;" and I do hereby declare that the following is a full and exact description of said invention.

The nature of my invention consists in compounding ground brick or well-burnt clay with asphaltum or coal tar, thereby forming a composition paste or cement, to be applied on felt or other surface to be used in roofing or elsewhere.

What I claim as my invention, and desire to secure by Letters Patent, is—

The compounding of burnt brick or well-burnt clay with asphaltum or coal tar, thereby forming a composition paste or cement.

RICHARD B. STEVENSON.

Witnesses:
JOHN L. GREENE, Jr.,
JOHN W. GREENE.